United States Patent

[11] 3,603,447

| [72] | Inventor | Richard Pott |
| | | Heide, near Detmold, Germany |
| [21] | Appl. No. | 844,310 |
| [22] | Filed | July 24, 1969 |
| [45] | Patented | Sept. 7, 1971 |
| [73] | Assignee | Westland-Gummiwerke GmbH & Co. |
| | | Westerhausen, Kreis Melle, Germany |
| [32] | Priority | July 31, 1969 |
| [33] | | Germany |
| [31] | | P 17 56 905.0 |

[54] BELT CONVEYOR
12 Claims, 4 Drawing Figs.

[52] U.S. Cl. .................................................... 198/152
[51] Int. Cl. .................................................... B65g 17/12
[50] Field of Search ........................................... 198/152, 153, 184, 193, 227

[56] References Cited
FOREIGN PATENTS

| 1,046,331 | 10/1966 | Great Britain ............. | 198/193 |
| 1,199,962 | 12/1959 | France ...................... | 198/152 |
| 1,542,285 | 9/1968 | France ...................... | 198/184 |

Primary Examiner—Edward A. Sroka
Attorney—Michael S. Striker

ABSTRACT: A conveyor comprising an endless band which constitutes a moving track and a plurality of adjacent open-topped foldable transporting members secured with their respective bottom portions to the endless band. The transporting members are arranged so that adjoining wall sections of adjacent transporting members are secured to each other and extend at least in the region of these adjoining wall sections at an acute angle relative to the endless band and in direction of movement thereof.

PATENTED SEP 7 1971
3,603,447
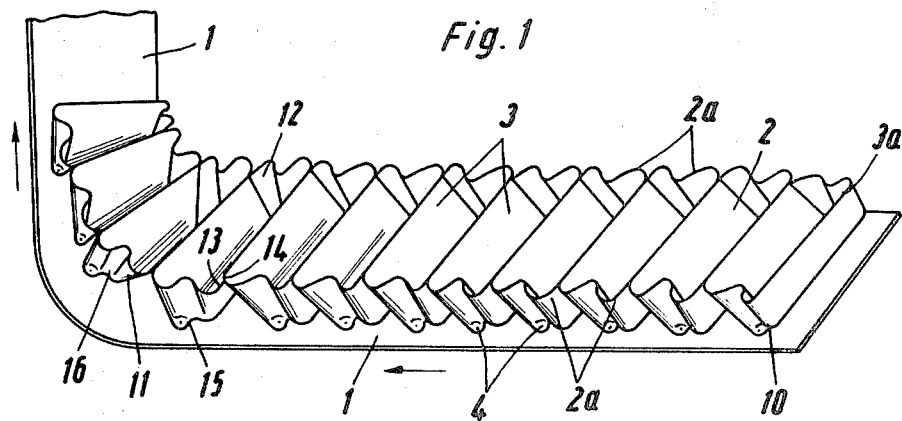
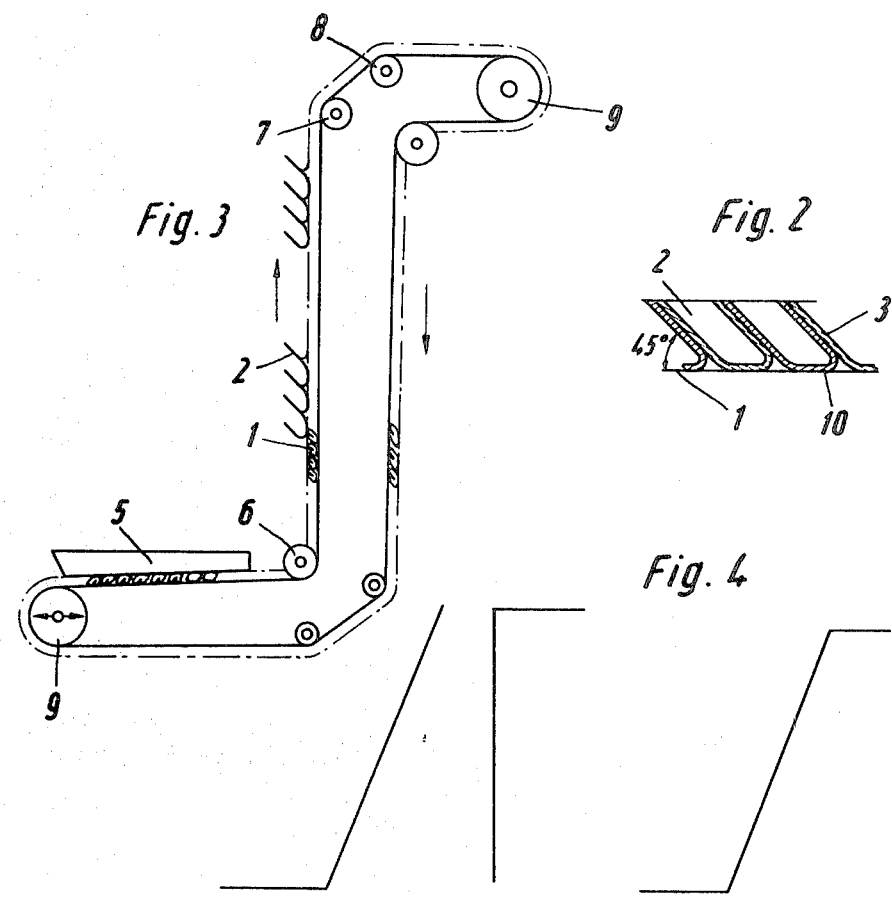
Inventor:
RICHARD POTT

BELT CONVEYOR

BACKGROUND OF THE INVENTION

The present invention relates to a belt conveyor especially adapted for substantially vertical transport.

Conveyor systems are known through which, by utilizing a plane endless conveyor belt, articles may be transported at an angle of inclination of maximum 22°.

In a further system, and by employing conveyor belts which are provided with article supports, articles may be transported at an inclined angle of about 35° depending upon the height of the respective supports.

Also known, are conveyor belts with corrugated sides which enable the belt to be operated at climbing angles of 60° to 70°. The latter is specially adapted for fine granular and cubical articles with a high gradient which are placed in the horizontal part of the belt so that the articles are distributed over and stabilized in this region of the belt and so that at the transition from the horizontal to a climbing or the vertical plane, no substantial displacement or revolving of the articles takes place. In this system, the belts are driven by drums and the corrugated sides are endless and are vulcanized to the belt in perpendicular relationship therewith. Additional article supports extends intermediate the corrugated sides, transversely relative to the elongation of the belt and are distributed at equal distances thereof.

Even though the latter arrangement enables belts to be operated at a 90° angle relative to the horizontal, the construction of such a belt is still complicated and, in addition, is only efficient for such articles as mentioned hereinbefore.

SUMMARY OF THE INVENTION

Object of the invention is to provide a simple conveyor arrangement which permits the endless belt to be operated at any desired climbing angle, and which is effective to transport a plurality of different articles regardless of such articles gradient.

A conveyor according to the present invention comprises an endless band which constitutes a moving track and a plurality of adjacent open-topped pocket-shaped transporting members secured to the endless band, each of this transporting members having opposite transverse walls each provided with transverse free edges, each of the transporting members being arranged so that they adjoin along at least the free edges of their respective transverse walls with corresponding free edges of the transverse walls of adjacent transporting members, and arranged so that the transverse walls of the transporting members extend at least in the region adjacent the transverse free edges thereof at an acute angle relative to the endless band and in the direction of movement thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a diagrammatic partial view of a conveyor belt according to the invention;

FIG. 2 is a partial longitudinal cross-sectional view of the conveyor belt of FIG. 1;

FIG. 3 is a schematic side view of the conveyor belt according to FIG. 1 and 2, and illustrating the manner in which the belt runs over and is driven by horizontal drums; and FIG. 4 shows travel patterns for the conveyor according to the invention.

PREFERRED EMBODIMENT OF THE INVENTION

Referring now to the drawings in which like reference numerals index like parts, the conveyor according to the present invention is seen to comprise an endless band or belt 1 which as shown in FIG. 3, constitutes a moving track and is made of an elastomeric material. A plurality of adjacent open-topped transporting members 2, for example, cup-, bucket-, or pocket-shaped are secured to the transporting surface of the belt 1. Each of the transporting members is seen to comprise opposite walls 3 which extend transverse relative to the elongation of the belt and are interconnected by bottom portions 10. The walls 3 and bottom portions 10 have a substantially rectangular configuration and a substantially U-shaped cross section, FIG. 2. The walls have free upper edges 3a which adjoin and are secured to the upper edges of the transverse walls of the adjacent transporting members, and the walls 3 are arranged in such a manner on the band 1 that they extend at an acute angle relative to the band and in the direction of movement thereof, which in the illustration shown in FIG. 1, is counterclockwise. Intermediate the walls 3 are foldable sidewalls 2 which when compressed are foldable in direction of travel of the band and which when expanded extend in a plane coincident with the elongation of the band. As shown in FIG. 1, adjacent walls, such as for example the walls 11 and 12, are connected to one another via their respective adjoining upper edges 13 and 14, respectively. The lower or bottom portions of the transporting members, such as for example 15 and 16, are at transversely opposite sides thereof, centrally connected to the band 1 such that in counterclockwise direction of travel of the band and during transition from the horizontal plane to the vertical plane, FIG. 1, the respective bottom portions are conveniently spread without undue stretching or pressure exerted on the remainder of the transporting members during such transition.

However, depending on the intended purpose of application of the band, the respective adjacent walls 3, as shown in FIG. 2, may equally well be integrally formed with one another.

The bottom portions of the transporting members may be secured to the band by means of screw members, and with such a connection, the bottoms are conveniently arranged with openings for the passage of the screw members. Alternatively, the bottom portions may be connected to the band by vulcanization or other type of bondage, or may be connected thereto by means of an adhesive.

Likewise, the adjacent transverse walls of the supporting members may either partially or wholly be connected to each other by means of screw members, vulcanizing, or an adhesive.

The walls, as shown in FIG. 2, may extend at an angle of for example 45° relative to the band, however, this angle may be varied for any convenient purpose.

The arrangement of FIG. 3 illustrates the manner in which the conveyor belt 1 according to the invention is driven over and by horizontal drums and experiences a change in direction which is effected by additional rollers such as 6, 7, 8 and 9. Articles, not shown, are loaded on the band 1 at 5 which extends in a horizontal plane. The items are then conveyed in the transporting members 2 to a second point at 9 where they are discharged from the band and from the transporting members. During the travel of the band between the points 5 and 9, the band is first brought into the vertical plane by roller 6, then into an oblique plane of 45° by roller 7 and thereafter back again to the horizontal plane by roller 8. During this travel the transported articles are well supported and do not experience any displacement in the above described transporting members.

FIG. 4 shows some further patterns along which the conveyor may be transported.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A conveyor comprising, in combination, an elongated endless band constituting a moving track; and a plurality of individual, adjacent open-topped, pocket-shaped transporting members having each a pair of opposite walls extending transverse to the elongation of said band and having spaced from said band free transverse edges, a pair of opposite sidewalls integrally connecting said transverse walls at opposite sides to each other, and a bottom wall secured to said endless band and integrally connecting said transverse and sidewalls to each other, adjacent transporting members being directly connected to each other only at said free transverse edges of said transverse walls, and said transverse walls of said transporting members extending at least in the region adjacent to said free transverse edges at an acute angle relative to said endless band and in the direction of movement thereof.

2. A conveyor as defined in claim 1, wherein said sidewalls are provided with folds inclined substantially in the same direction relative to said endless band as said transverse wall.

3. A conveyor as defined in claim 1, wherein said transporting members are substantially rectangular and have a substantially U-shaped cross section.

4. A conveyor as defined in claim 1, wherein said opposite sidewalls extend in a planes coincident with the elongation of said endless band and foldable in the direction of movement thereof.

5. A conveyor as defined in claim 1, wherein said transporting members are made of an elastomeric material.

6. A conveyor as defined in claim 1, wherein said bottom walls of said transporting members are secured to said endless band by means of screw members.

7. A conveyor as defined in claim 1, wherein said bottom walls of said transporting members are secured to said endless band by means of screw members, and wherein said bottom walls at axially opposite ends thereof have bores defined therethrough for the passage of said screw members.

8. A conveyor as defined in claim 1, wherein said bottom walls of said transporting members are vulcanized to said endless band.

9. A conveyor as defined in claim 1, wherein said bottom walls of said transporting members are connected to said endless band by means of an adhesive.

10. A conveyor as defined in claim 1, wherein said transverse free edges of said transverse walls of adjacent transporting members are bonded to each other.

11. A conveyor as defined claim 1, wherein said transverse free edges of said transverse walls of adjacent transporting members are secured to each other by means of an adhesive.

12. A conveyor as defined in claim 1, wherein said transverse walls of said transporting members extend at an angle of 45° relative to said endless band.